US006968424B1

(12) United States Patent
Danilak

(10) Patent No.: US 6,968,424 B1
(45) Date of Patent: Nov. 22, 2005

(54) METHOD AND SYSTEM FOR TRANSPARENT COMPRESSED MEMORY PAGING IN A COMPUTER SYSTEM

(75) Inventor: Radoslav Danilak, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 369 days.

(21) Appl. No.: 10/215,139

(22) Filed: Aug. 7, 2002

(51) Int. Cl.$^7$ ............................................. G06F 12/00
(52) U.S. Cl. ..................... 711/113; 711/154; 711/170; 711/173; 710/68
(58) Field of Search ...................... 711/113, 170–173, 711/206, 154; 710/68

(56) References Cited

U.S. PATENT DOCUMENTS

| | | | | |
|---|---|---|---|---|
| 5,696,927 A | * | 12/1997 | MacDonald et al. | ........ 711/207 |
| 6,516,397 B2 | * | 2/2003 | Roy et al. | ................... 711/170 |
| 2002/0073298 A1 | * | 6/2002 | Geiger et al. | ............... 711/206 |

* cited by examiner

Primary Examiner—Mano Padmanabhan
Assistant Examiner—Jasmine Song
(74) Attorney, Agent, or Firm—Wagner, Murabito & Hao LLP

(57) ABSTRACT

A method and system for implementing transparent compressed memory paging within a computer system. Data compression is performed in memory to increase resources available to the computer system and to reduce disk accesses. The compression is performed transparently to the operating system which requires no special software interfaces to make use of the reclaimed memory. In a first embodiment, data compression is performed in hardware to reclaim memory. This reclaimed memory is not made available to the operating system but is rather used as a hardware controlled disk cache to increase system performance. In this embodiment, a novel method is employed to reduce duplicate memory pages in the disk cache and the operating system memory. In another embodiment, the reclaimed memory is made available in a transparent way to the operating system. Variable compression ratios can lead to varying physical memory space available for the operating system. Therefore, if actual memory space becomes near exhausted, a process is automatically triggered that exclusively allocates blocks of physical memory to a driver thereby removing them from operating system usage. In the second embodiment, a special cache table is used for uncompressed physical memory pages.

50 Claims, 15 Drawing Sheets

METHOD AND SYSTEM FOR TRANSPARENT COMPRESSED MEMORY PAGING IN A COMPUTER SYSTEM

BACKGROUND OF THE INVENTION

1. Field of the Invention

Embodiments of the present invention relate to the field of data compression and data management. More specifically, embodiments of the present invention relate to the field of using data compression to increase available memory to a computer system, e.g., for use by an operating system, application program, driver, etc.

2. Related Art

Prior art computer systems extend available memory resources by data compression. Well known compression techniques exist for reducing the size of digital data while retaining the information stored in the data. Data compression has many advantages, including extending the available amount of memory resources available to a computer system as well as increasing system performance by reducing the amount of required read and write accesses to a disk storage unit. The amount of compression that is achievable for any piece of data depends largely on the nature of the data being compressed.

FIG. 1A illustrates one prior art system 10 for performing compression to extend the available memory available to a computer system. In system 10, an application software program 18 interfaces with an operating system 14. The application software program 18 maintains data in "virtual memory" while the operating system 14 maintains data in "physical memory." A virtual memory manager 16 performs the task of "paging" memory blocks between the volatile memory 12 and the disk storage unit 22, as required by the application program 18, and also maintains a mapping between the virtual memory and the physical memory. Paging, performed by the memory manager 16, involves storing infrequently used memory pages onto disk 22 while maintaining frequently used memory pages in volatile memory 12, e.g., random access memory (RAM).

In the system 10 shown in FIG. 1A, the memory pages stored on disk 22 are stored in compressed form. By compressing the pages, more information can be stored on the disk 22 and also system performance increases because fewer read and write accesses are used to access and store the information. System 10 utilizes software compression/decompression techniques to compress and decompress the memory pages which are supplied to, and received from, the operating system. While having the advantages of increased memory capacity and higher system performance, system 10 also has its disadvantages. One disadvantage is that system 10 requires a specialized operating system to process the compressed pages to and from the disk 22. Many commercially available operating systems do not recognize compression of the memory pages from disk 22 and therefore are incompatible with the techniques employed by system 10. Another disadvantage of system 10 is that it utilizes software decompression/compression processes which demand large amounts of processor resources and are relatively slow to perform. Again, software decompression and compression processes require specialized operating systems that have provision for these tasks.

FIG. 1B illustrates memory mapping diagrams 30 of another system that implements memory page compression/decompression. In this prior art system, the compress/decompression engine may be hardware based. In this system, the application program understands a virtual memory map 32 which contains uncompressed pages and maps to a physical memory space 34 that is presented to the operating system. This physical memory space 34 contains uncompressed pages. One uncompressed memory page 36 is shown. However, the on-chip volatile memory stores memory pages according to another physical memory map 38 which may store compressed pages as well as some uncompressed pages. One compressed page 40 is shown and one uncompressed page 42 is shown. In well known fashions, memory pages from the physical memory space are paged out and retrieved from the disk drive 22 as needed by the operating system. The disk 22 may store uncompressed pages due to the hardware compression/decompression engine. Because compression is employed in the volatile memory, the physical memory map 34 shown to the operating system appears larger than the actual volatile memory capacity of the computer system (e.g., physical memory space 38). The extra space of physical memory map 34 is depicted as a dashed region 35.

Although the hardware compression/decompression engine performs better than the software compression/decompression processes employed by the prior art system of FIG. 1A, the prior art system of FIG. 1B still has its disadvantages. One disadvantage of the system described with respect to FIG. 1B is that the physical memory space 34 made available to the operating system varies in size depending on the achievable compression ratio employed in the physical memory space 38. The compression ratio depends on the nature of the data being compressed. For instance, assuming no pages could be compressed, e.g., a worst case compression scenario, then physical memory space 34 would be equal physical memory space 38 in size. However, as the compression ratio improves, physical memory space 34 increases in size. Therefore, physical memory space 34 varies in size dynamically depending on the nature of the data stored in the pages of the physical memory. This poses a great challenge because most operating systems are incompatible with a physical memory space that varies in size dynamically. In contrast, most commercial operating systems require a physical memory space of a fixed size, otherwise catastrophic memory overruns can occur.

Therefore, the above described memory page compression techniques of the prior art are incompatible with most commercially available operating systems.

SUMMARY OF THE INVENTION

Accordingly, an embodiment of the present invention provides a system and method for performing memory page compression that is compatible with commercially available operating systems. In yet another embodiment, the present invention is directed to a memory page compression system that utilizes a hardware compression/decompression engine. In yet another embodiment, the present invention is directed to a memory page compression system that performs compression and decompression of memory pages in a way that is transparent to the operating system.

A method and system are described for implementing transparent compressed memory paging within a computer system. Memory page compression is performed in volatile memory to increase resources available to the computer system and to reduce disk accesses to thereby increase system performance and reduce power consumption. In the various embodiments described herein, the compression is performed transparently to the operating system which requires no special software interfaces to make use of the reclaimed memory. In addition, the operating system is presented with a fixed sized physical memory map that does not dynamically change size depending on the nature of the data stored in the memory pages. Furthermore, the memory pages stored on the disk storage unit are uncompressed.

In a first embodiment, memory page compression is performed in hardware to provide an extended amount of volatile memory, e.g., "reclaimed volatile memory." The physical memory map presented to the operating system is of a fixed size because this reclaimed volatile memory is not made available to the operating system but is rather used as a hardware controlled disk cache to increase system performance. In this embodiment, the size of the disk cache may vary due to the achievable compression ratio of the memory pages. Moreover, in this embodiment, a novel method is employed to reduce duplicate memory pages between the physical memory map and the disk cache. According to this embodiment, disk reads place pages into the uncompressed memory cache and a pointer is placed into the disk cache. If the memory page is not used for a while, it is bumped from the uncompressed cache, compressed and stored in the non-cache memory available to the operating system. If the memory is written by the processor, then the unmodified page is removed from the disk cache list, compressed, and stored in the disk cache. The modified version is placed in the uncompressed memory cache. Subsequently, the processor may obtain the original page from the disk cache and page duplicates are avoided.

In another embodiment, the reclaimed volatile memory is made available in a transparent way to the operating system while maintaining the appearance of a fixed-sized physical memory space presented to the operating system. This appearance is maintained by providing a fixed-sized physical memory space to the operating system (e.g., the "operating system physical memory space") that is larger than the physical memory space available in the volatile memory space (e.g., the "actual physical memory space"). However, variable compression ratios of the actual physical memory space lead to a varying sized operating system physical memory space. Therefore, to maintain the appearance of a fixed sized operating system physical memory space, this embodiment performs the following actions. If the actual physical memory space becomes near exhausted (e.g., due to a poor compression ratio), a special process is automatically triggered that exclusively allocates blocks of operating system physical memory space to a driver thereby removing them from operating system usage. It is appreciated that the driver does not use this memory space, it merely deallocates it from the operating system to prevent memory over-run. When the compression ratio improves such that more free space becomes available in the actual physical memory space, the driver will allocate the memory block thereby returning it back to the operating system for use.

In the second embodiment, the actual physical memory stores a majority of compressed memory pages and a minority of uncompressed memory pages that are frequently used. A special cache table used for quickly identifying the uncompressed pages for rapid retrieval thereof for supply to the operating system. Compressed memory pages may be linked via pointers in each compressed page. The identification of empty memory pages is made more efficient by a special "empty memory page" which contains a listing of empty memory pages in the actual physical memory space. Multiple empty memory pages may be linked via pointers in each. In one implementation, the size of the uncompressed memory pages can be from 0.5 kilobytes to 4 kilobytes while the compressed memory pages can be from 64 bytes to 256 bytes. In one embodiment, the compressed memory page is set to a size, e.g., 128 bytes, to hide the DRAM precharge period to increase performance.

DETAILED DESCRIPTION OF THE INVENTION

Reference will now be made in detail to the preferred embodiments of the present invention, a method and system are described for implementing transparent compressed memory paging within a computer system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

General Hardware Environment

Figure 1A:
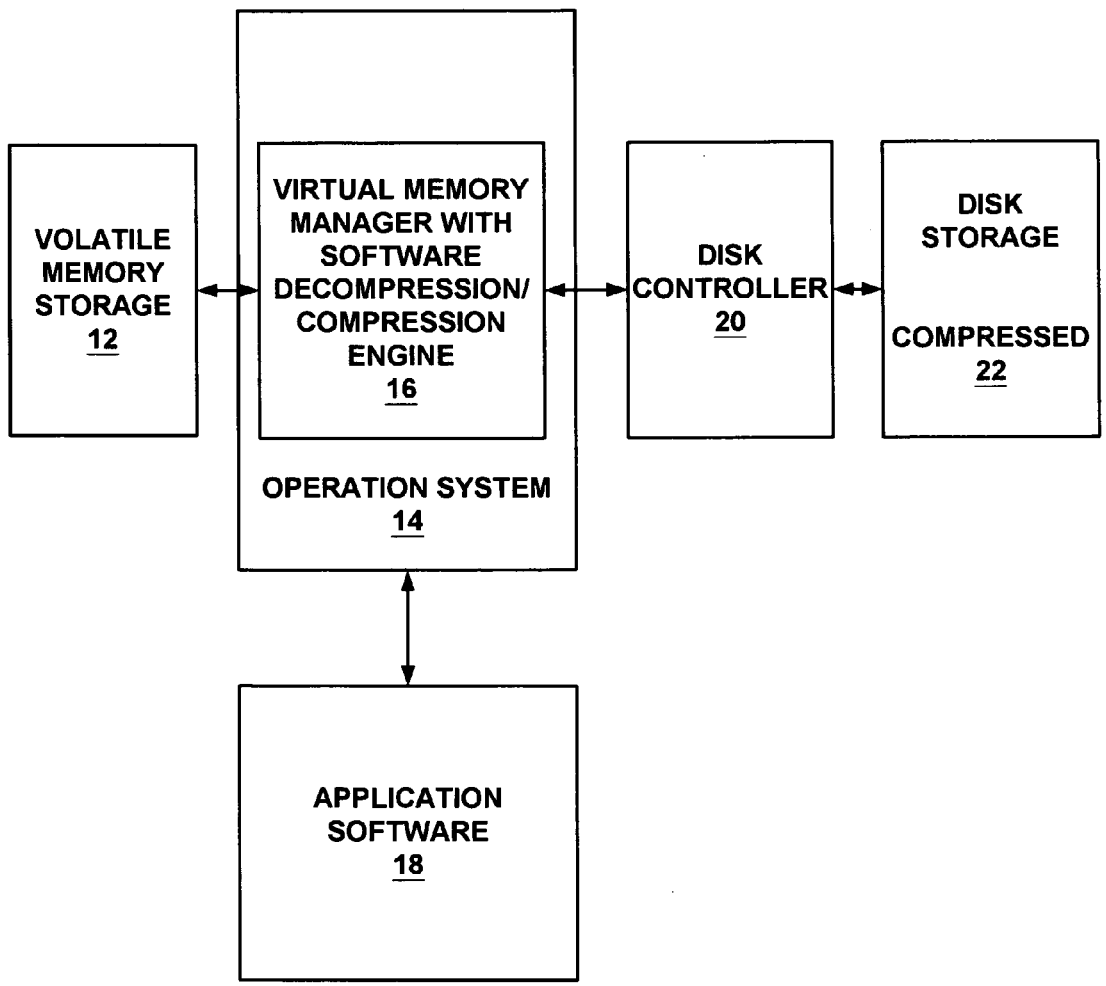
FIG. 1A is a block diagram of a prior art system for compressed memory paging that stores compressed memory pages on disk and uses a software engine for decompression/compression.
Figure 1B:
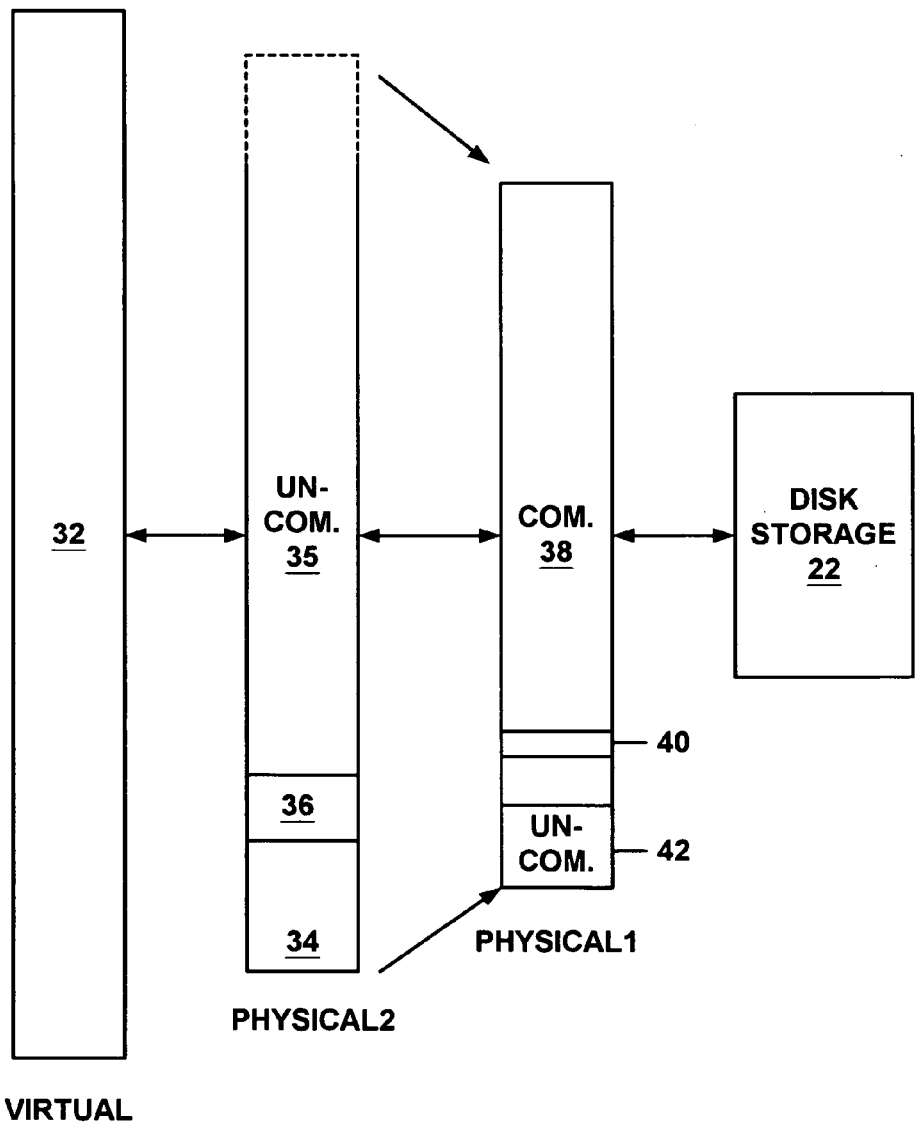
FIG. 1B is a memory map diagram of a prior art system for compressed memory paging that uses a hardware engine for decompression/compression but provides a variable sized physical memory space to the operating system.
Figure 2:
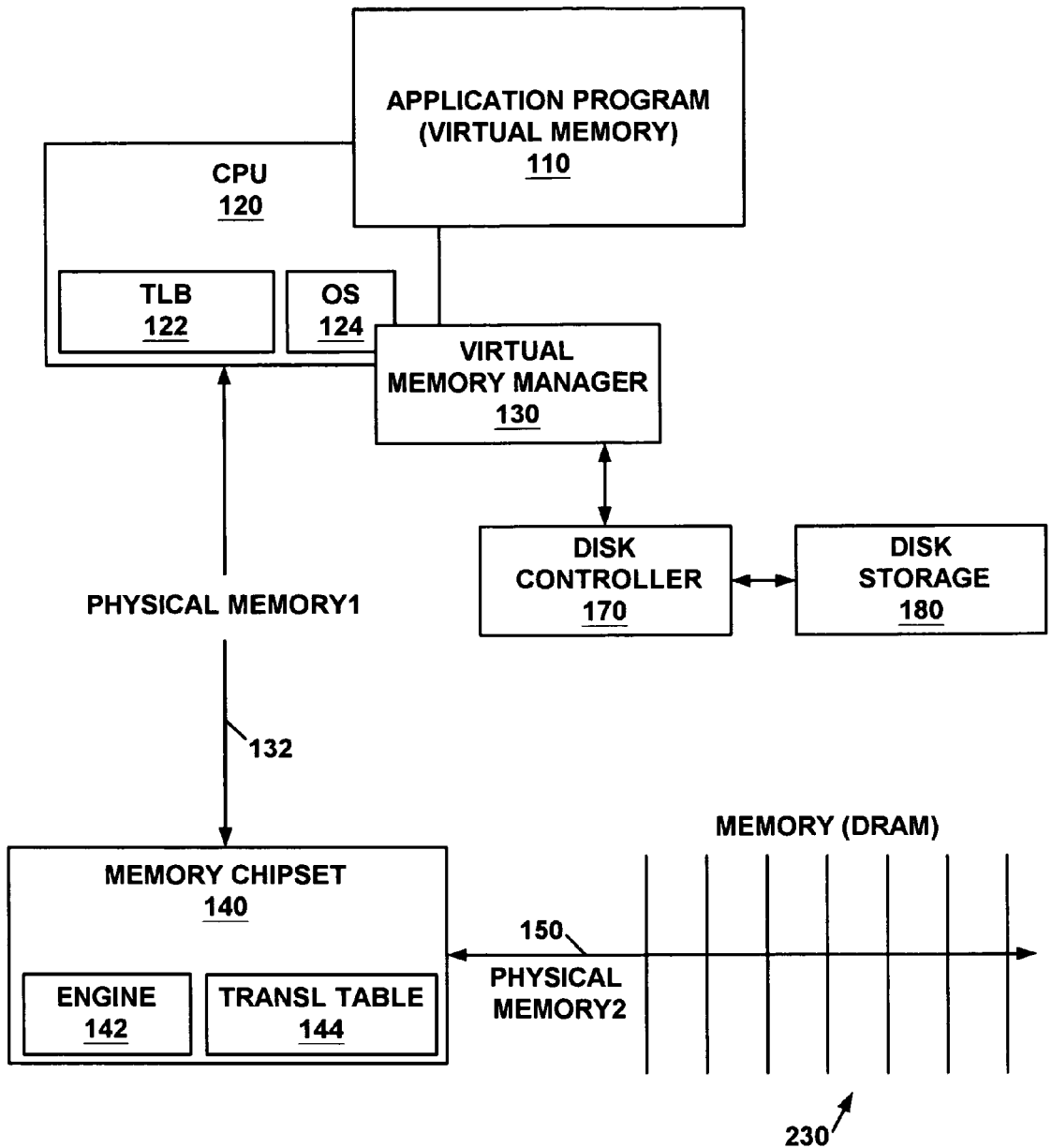
FIG. 2 is a logical block diagram of a transparent compressed memory paging computer system in accordance with an embodiment of the present invention.

FIG. 2 illustrates an exemplary system 100a for performing transparent compressed memory paging in accordance with an embodiment of the present invention. System 100a comprises a processor 120 which executes an application program 110, an operating system 124 and also accesses a translation lookaside buffer (TLB) 122. The TLB 122 is used to translate between a virtual memory space, which is used by the application program 10, and a first physical memory space (carried over bus 132) which is used by the operating system 124. A virtual memory manager 130, which may be integrated with the operating system, performs well known memory paging functions between physical memory and a disk subsystem which includes a disk drive 180 and a controller 170. The disk drive 180 stores uncompressed memory pages. In this embodiment, the first physical memory space maps only uncompressed memory pages over bus 132. Therefore, the operating system 124, including the virtual memory manager 130, processes only uncompressed memory pages.

A volatile memory 230 is provided which may be implemented using dynamic random access memory (DRAM), in one implementation, but could be of any type of well known volatile memory, e.g., SRAM, RAM, etc. The volatile memory 230 interfaces with a hardware chipset 140 for controlling access to the DRAM 230. The volatile memory 230 is accessed using a second physical memory map (presented over bus 150) and stores a majority of compressed memory pages in one embodiment. The volatile memory 230 may also contain a minority of uncompressed memory pages in this embodiment. Importantly, the chipset 140 contains a hardware implemented compression/decompression engine 142 and a translation table to translate between the first physical memory space (made available to the operating system 124) and the second physical memory space (used by the volatile memory 230). Any of a number of well known compression/decompression techniques may be employed within the hardware engine 142.

In operation, the hardware engine 142 compresses some of the memory pages of the first physical memory space for storage into the DRAM 230. By compressing, this extends the amount of physical memory available in the computer system. However, the chipset 140 provides only uncompressed memory pages over bus 132 to the processor. This is done by performing decompression within the engine 142 before any pages are supplied to the processor over bus 132. Therefore, the operating system 124 sees only memory pages of the first physical memory map, e.g., uncompressed pages. It is appreciated that one uncompressed memory page of the first physical memory map may map to one or more compressed memory pages of the second physical memory map depending on the amount of compression available for the page. It is further appreciated that the decompression/compression engine does not operate on the uncompressed pages stored in DRAM 230.

Therefore, the usage model is generally to increase available memory for the computer system in an operating-system-transparent way. For example, expanding memory through compression from 256 MB to 512 MB could significantly reduce the number of disk accesses, which improves performance and reduces power consumption (e.g., for mobile disk drives). No changes in operating system software should be required. With support up to 2 GB of physical memory, up to 4 GB available memory could be offered.

Disk Caching Embodiment

Figure 3A:
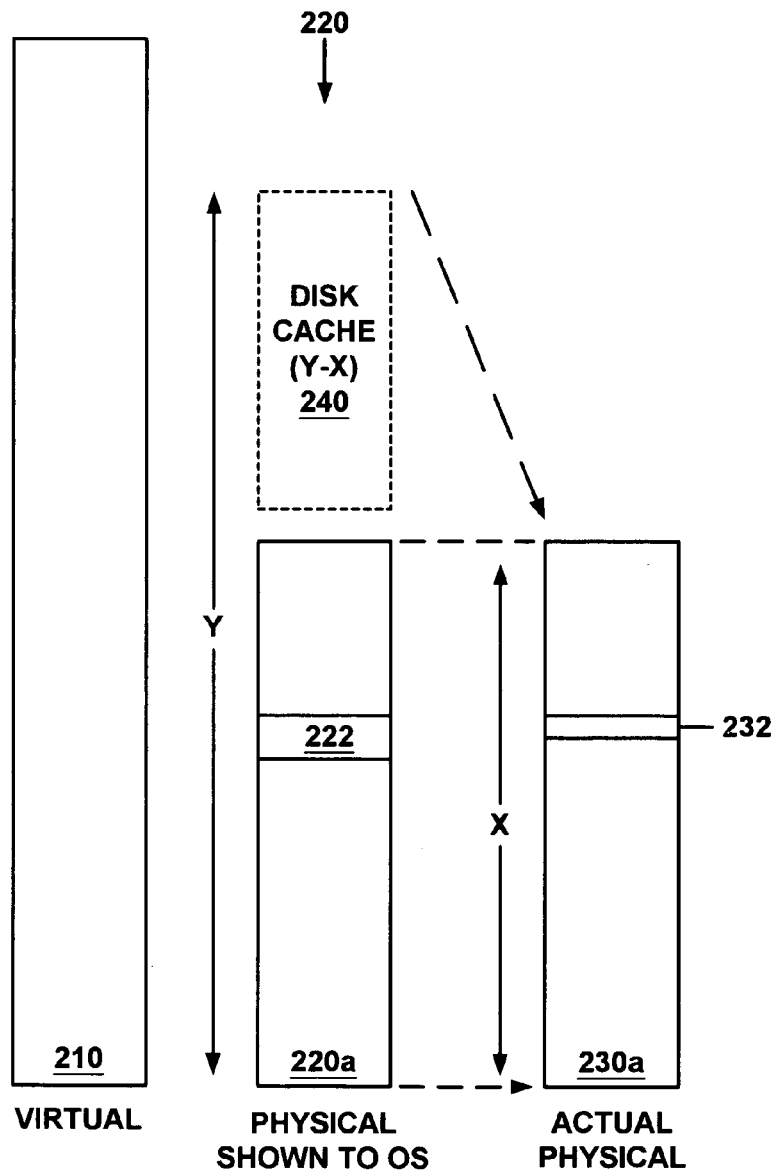
FIG. 3A is a memory map illustrating reclaimed physical memory used as a disk cache according to a disk caching embodiment of the present invention.

FIG. 3A illustrates a memory map configuration according a disk caching embodiment of the present invention that can generally utilize the hardware system 100a shown in FIG. 2. According to this embodiment, the memory made available via memory page compression is not made directly available to the operating system, but rather is used as a disk cache to improve system performance. Because the memory made available via compression is not made available to the operating system directly, the operating system sees only a fixed sized physical memory map which is equivalent to the uncompressed page capacity of the DRAM 230. Further, all compression/decompression of the memory pages is performed transparently to the operating system because the hardware chipset 140 performs the compression/decompression and supplies only uncompressed pages to the operating system. For these reasons, any of a number of well known commercially available operating systems can be implemented as operating system 124. This includes ones that are not compatible with compressed memory paging, e.g., Microsoft Windows™, etc., because the compressed memory paging of the present invention is performed transparently to the operating system.

As shown in FIG. 3A, in diagram 200, the virtual memory map 210 used by the application programs is relatively large because it involves memory paging between volatile memory and the disk subsystem. The TLB translates this virtual memory space 210 to a first physical memory space 220. Memory space 220 includes a first portion 220a that is used by the operating system. Assuming the DRAM capacity is 2 GB, for example, the size of the physical memory map portion 220a will be 2 GB (e.g., the same size as physical memory space 230a) and this value is fixed with respect to the operating system. One exemplary uncompressed memory page 222 of portion 220a is shown. Memory page 222 can be between 0.5 k to 4 k in size, in one implementation. Preferred sizes are 1 k and 4 k.

The pages of physical memory map 220 map onto physical memory map 230a but physical memory map 220 is larger than memory map 230a (e.g., larger than 2 GB in this example) due to page compression. The extended memory made available due to the hardware controlled page compression is shown as portion 240 which is the second portion of memory space 220. In this embodiment of the present invention, this portion 240 is not shared with the operating system but is rather used by the disk subsystem as a disk cache to increase system performance. One exemplary compressed memory page 232 is shown. Memory page 232 can be between 64 and 256 bytes in size, in one implementation.

One preferred size is 128 bytes. An uncompressed memory page 222 may map to one or more compressed pages of memory map 230*a*.

The amount of memory 240 will vary in size dynamically depending on the compression ratio of the memory pages within the DRAM 230 as shown by physical memory space 230*a*. Although, the disk cache 240 dynamically varies in size, depending on the compression ratio achieved within the DRAM 230, in contrast, the physical memory map 220*a* provided to the operating system does not vary in size. As a result, the use of the disk cache 240 as well as the compression/decompression of the memory pages are both done transparently to the operating system 124.

Figure 3B:
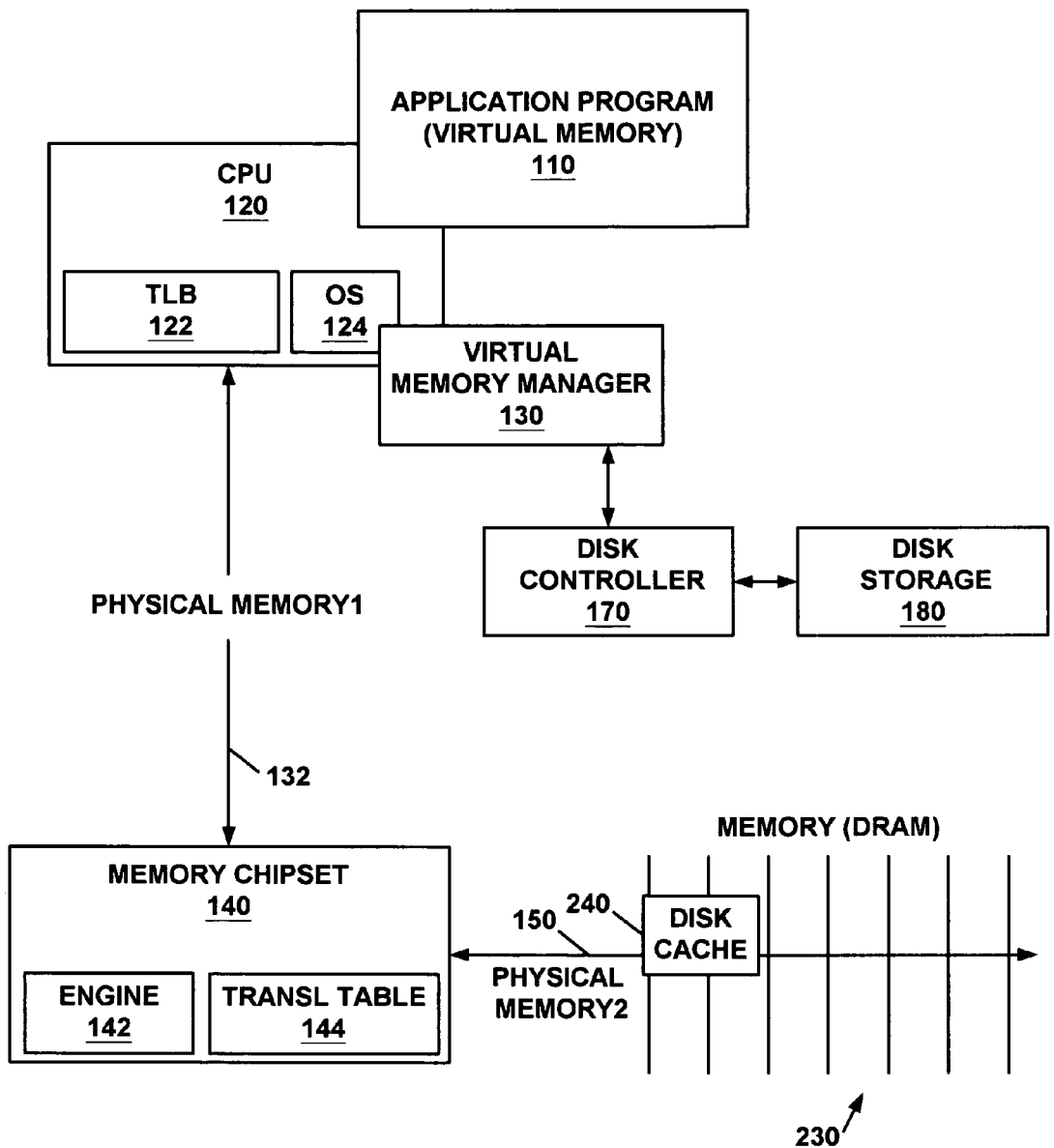
FIG. 3B is a logical block diagram of the disk caching embodiment of the present invention as described with respect to FIG. 3A.

FIG. 3B illustrates an exemplary block diagram of a system 110*b* that implements the disk caching embodiment of the present invention. System 100*b* is analogous to system 100*a* except the disk cache 240 is shown within DRAM 230 and is used by the disk subsystem (170 and 180) to increase system performance. The disk controller 170 accesses the disk cache via the chipset hardware 140 over bus 132. The present invention uses the disk cache 240 to increase system performance according to many well known techniques.

Figure 3C:
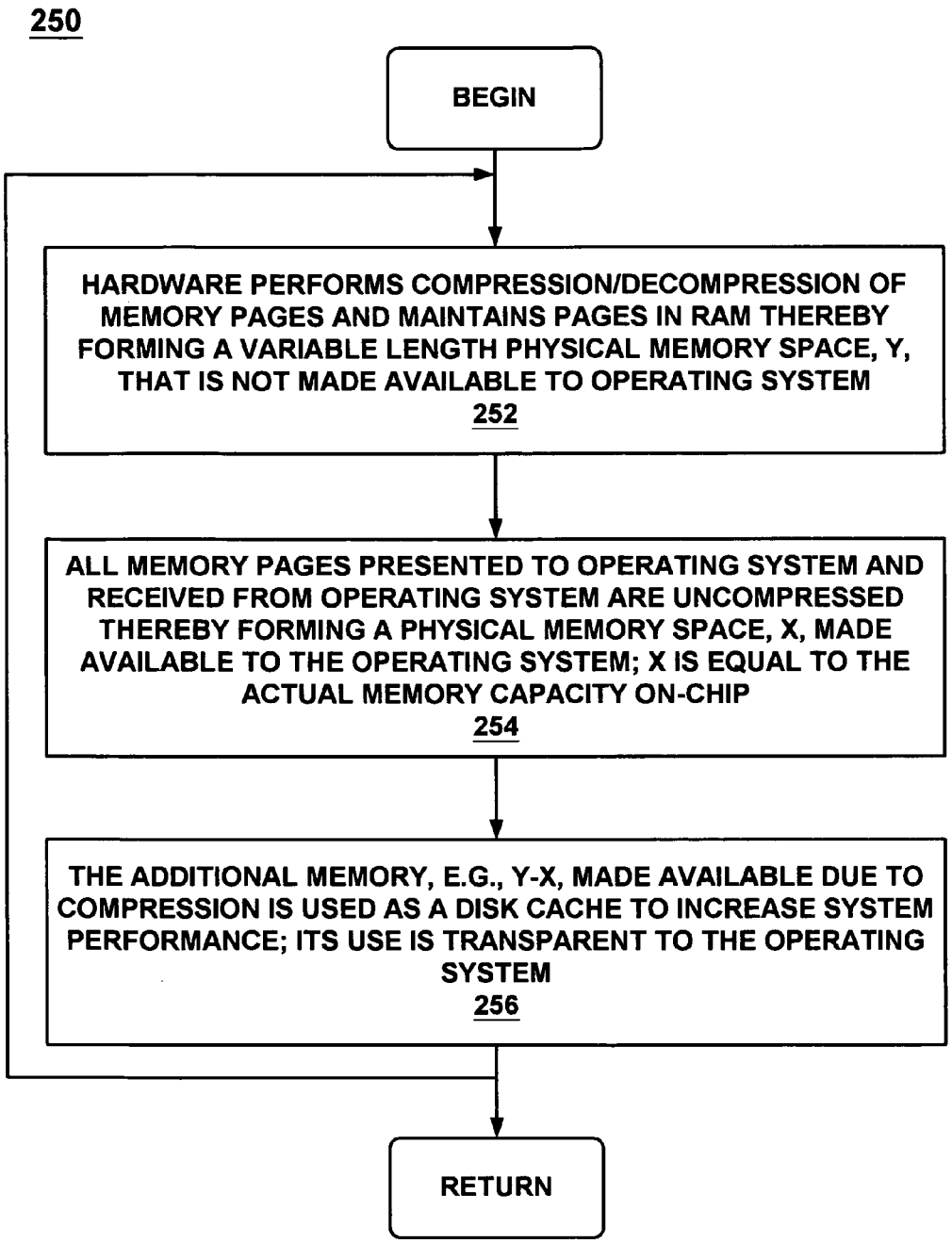
FIG. 3C is a flow diagram of steps performed by the disk caching embodiment of the present invention as described with respect to FIG. 3A and FIG. 3B.

FIG. 3C is a flow diagram 250 illustrating steps performed by the disk caching embodiment of the present invention for performing transparent compressed memory paging to increase system performance by making available a disk cache. At step 252, the chipset hardware performs compression/decompression of memory pages in memory thereby forming a physical memory space of length y, that is variable. Only a portion of this space, x, (which is fixed length) is made available to the operating system. The variable length portion, y-x, also called cache 240, is not made available to the operating system. At step 254, only uncompressed memory pages are supplied to, and received by, the operating system using the fixed-length portion x of the physical memory space, which equals the capacity of the volatile memory. This is performed so that operating systems that happen to be incompatible with compressed paging can still be used by the present invention. At step 256, the disk cache portion, y-x, is made available to a disk subsystem for disk caching operations (with larger read-ahead) to improve system performance.

For example, a machine with 256 MB DRAM could have almost 512 MB available by memory extension. Of this, 256 MB could be used for the disk cache, so almost all applications will be in cache. No changes in any software is necessary in this scenario because the compression is transparent. Moreover, machines with 2 GB of physical memory could have up to 4 GB of available memory.

Transparently Increasing Operating System Memory

In a second embodiment of the present invention, the memory made available via page compression is made available transparently to the operating system in a mechanism that does not burden the operating system with the dynamically varying size of the reclaimed physical memory. Generally, the hardware presents a fixed size logical memory to the operating system (for example twice as physical size) for its use. The fixed size of the logical memory is based on a typical compression ratio. However, when the compression ratio drops to a predetermined level, the physical memory may not be unable to hold all the compressed data that the operating system thinks it can use according to the size of its logical memory. In this case, actions can occur to address this situation. Either the system starts paging-out pages in a pre-reserved disk location or the system trims the number of available pages in the operating system. For trimming the operating system pages, one embodiment uses an OS driver. The OS driver starts locking dummy pages and notifies the hardware that pages could be discarded (and released from physical memory). Therefore, according to this embodiment, the OS driver acts as a consumer of free memory from the operating system when the compression ratio goes down, and returns them back when the compression ratio improves.

Figure 4A:
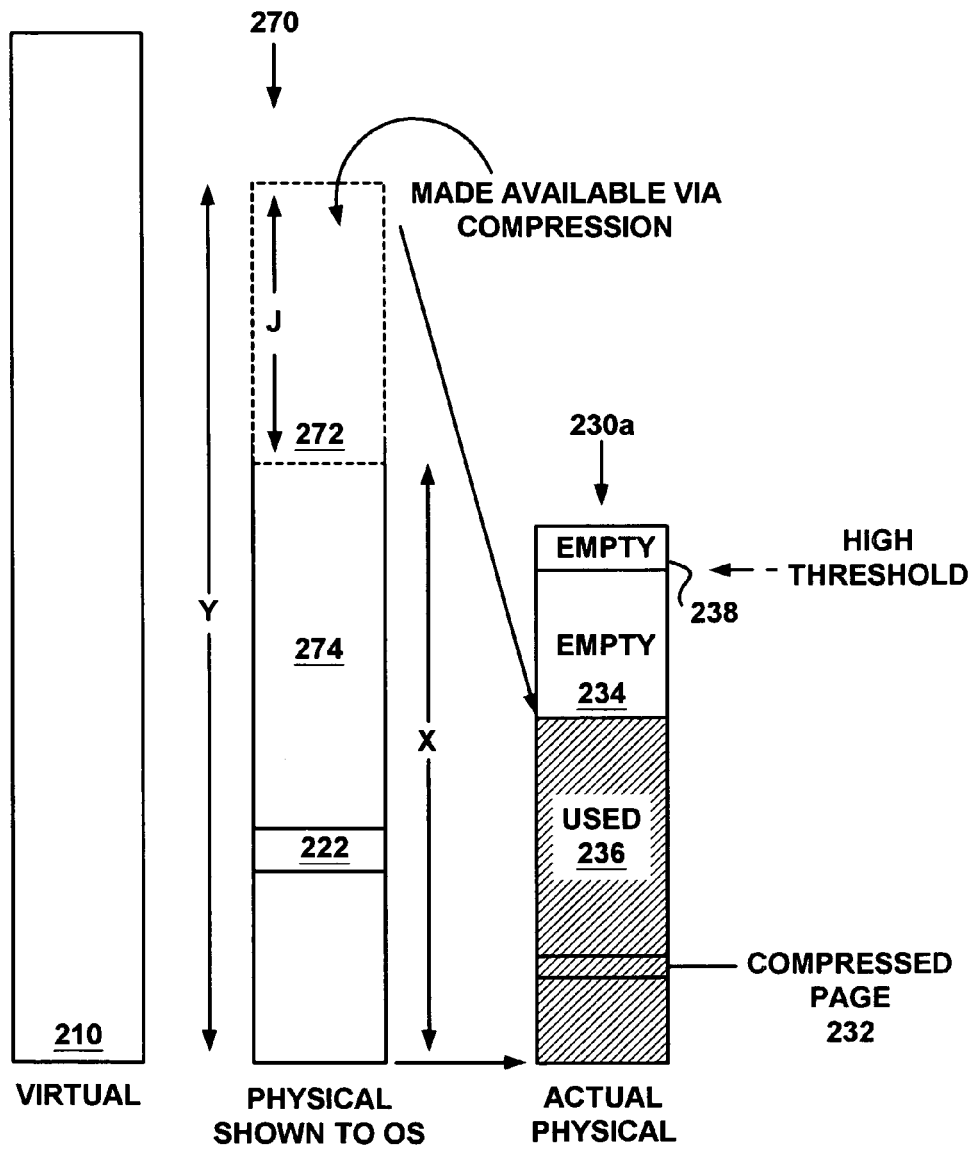
FIG. 4A is a memory map illustrating a second embodiment of the transparent compressed memory paging computer system of the present invention that provides reclaimed memory to the operating system while still maintaining a fixed-sized physical memory space.

The above described functionality is explained with reference to memory usage scenarios depicted in FIGS. 4A, 4B and 4C. FIG. 4A illustrates memory map diagrams 260*a*. According to this embodiment, the first physical memory map 270 is made available to the operating system and maps uncompressed memory pages. The size of memory map 270 is set to a fixed amount that is larger than the physical memory space 230*a* because it includes a portion 272 that represents reclaimed memory via page compression. Unlike the first embodiment, this amount of memory 272 is made available to the operating system. The size of portion 272 is based on an assumed typical compression ratio amount. According to this embodiment, the operating system is free to use all of the memory space, y, within memory map 270. In some situations, the size y can be as large as twice the size of x (the uncompressed volatile memory capacity).

FIG. 4A therefore illustrates a situation where the operating system is given a fixed sized memory space 270 that is larger than the actual physical memory 230*a*. In this case, the operating system memory space 270 maps to only a portion of physical memory space 230*a* shown by the "used" region 236. In this situation, the compression ratio is good thereby providing a comfortable amount of extra or "empty" volatile memory 234. A high water mark or threshold level 238 is set in the volatile memory map 230*a* to a point where the volatile memory is nearly exhausted. In contrast, in the situation of FIG. 4A, the actually used memory 236 is well below the high threshold mark 238 and therefore no memory over-run can occur even though the operating system's physical memory map 270 is much larger than the actual physical memory map 230*a*.

Figure 4B:
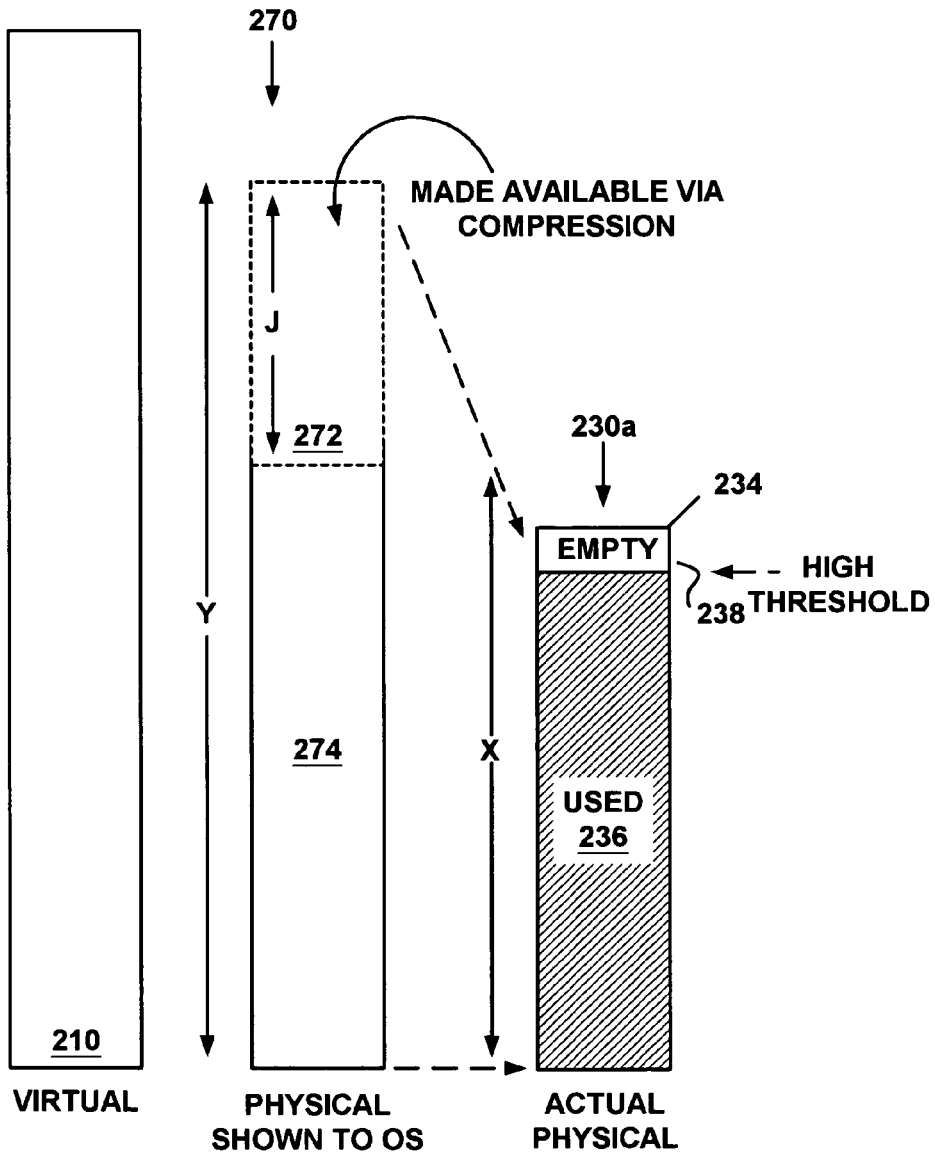
FIG. 4B memory map illustrating the second embodiment of the present invention where the actual physical memory space is nearly exhausted.

FIG. 4B illustrates a situation with analogous diagrams 260*b* to FIG. 4A, except the compression ratio has decreased thereby causing the used portion 236 of memory map 230*a* to increase to the high threshold point 238. At this point, a memory over-run can occur if the compression ratio decreases any further or any more physical memory is used by the operating system. In order to prevent a potential memory over-run, the situation of FIG. 4B triggers a special event in accordance with the second embodiment of the present invention. The conditions that lead to triggering of this event are transparent to the operating system. In this embodiment, physical memory is deallocated from the operating system and, moreover, this deallocated memory is "dummy memory" because it is not used for any other purpose. In accordance with one implementation, an OS driver is signaled by hardware that the situation of FIG. 4B has occurred. This can occur as a result of an interrupt generated to the OS driver causing it to request allocation of a memory block thereby deallocating the memory block from the operating system.

Figure 4C:
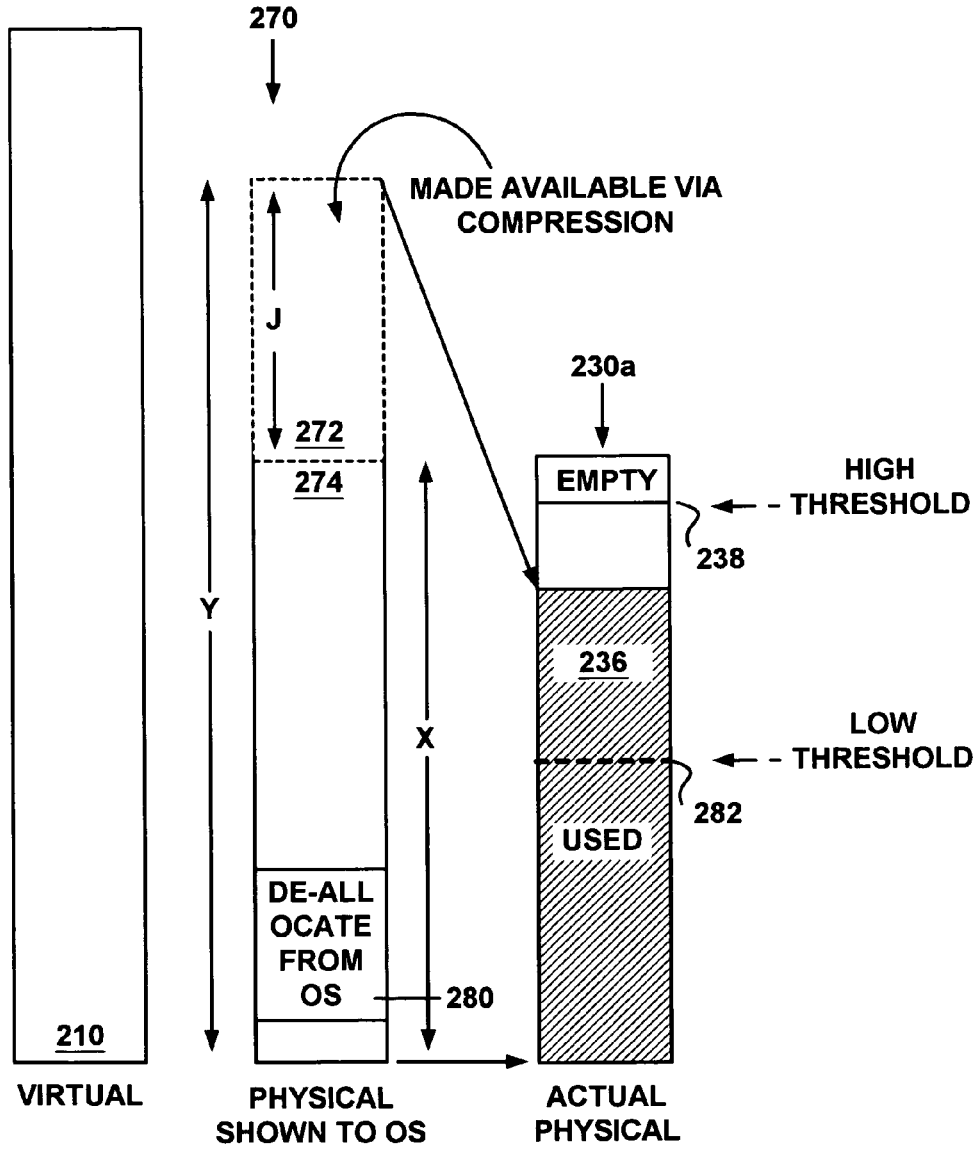
FIG. 4C memory map illustrating the second embodiment of the present invention where the actual physical memory usage is reduced as a result of a memory block deallocated from the physical memory space of the operating system.

FIG. 4C illustrates the result of such an interrupt. As shown in these diagrams 260*c*, the memory block 280 has been deallocated from the operating system (e.g., given to the OS driver which treats the block as a dummy block). When a memory block is requested by an OS driver, the operating system routinely locates available memory pages that can be erased to satisfy the needs of the OS driver. This is performed using well known memory management techniques and typically involves pages that are merely duplicates to those stored on disk. In this case, the OS driver does not use the memory block 280. Therefore, the dummy pages of memory block 280 are erased thereby reducing the size of the used memory 286 in memory map 230*a*. The used memory portion 236 drops below the high threshold level 238.

In effect, the OS driver "steals" memory from the operating system thereby forcing the amount of used memory to decrease. The size of the memory block 280 can vary, but in the worst case situation it would be (y-x) in size and would correspond to the situation where the compression is so poor that little to no compression is happening at all.

The memory block 280 remains deallocated from the operating system until some other event occurs that obviates the need for the memory block 280. In one embodiment, the other event occurs when the used portion 236 falls below a "low threshold" point 282. Accordingly, at the low threshold point 282, a different interrupt is triggered causing the OS driver to deallocate the block 280 from its use thereby freeing the block for the operating system.

Figure 5:
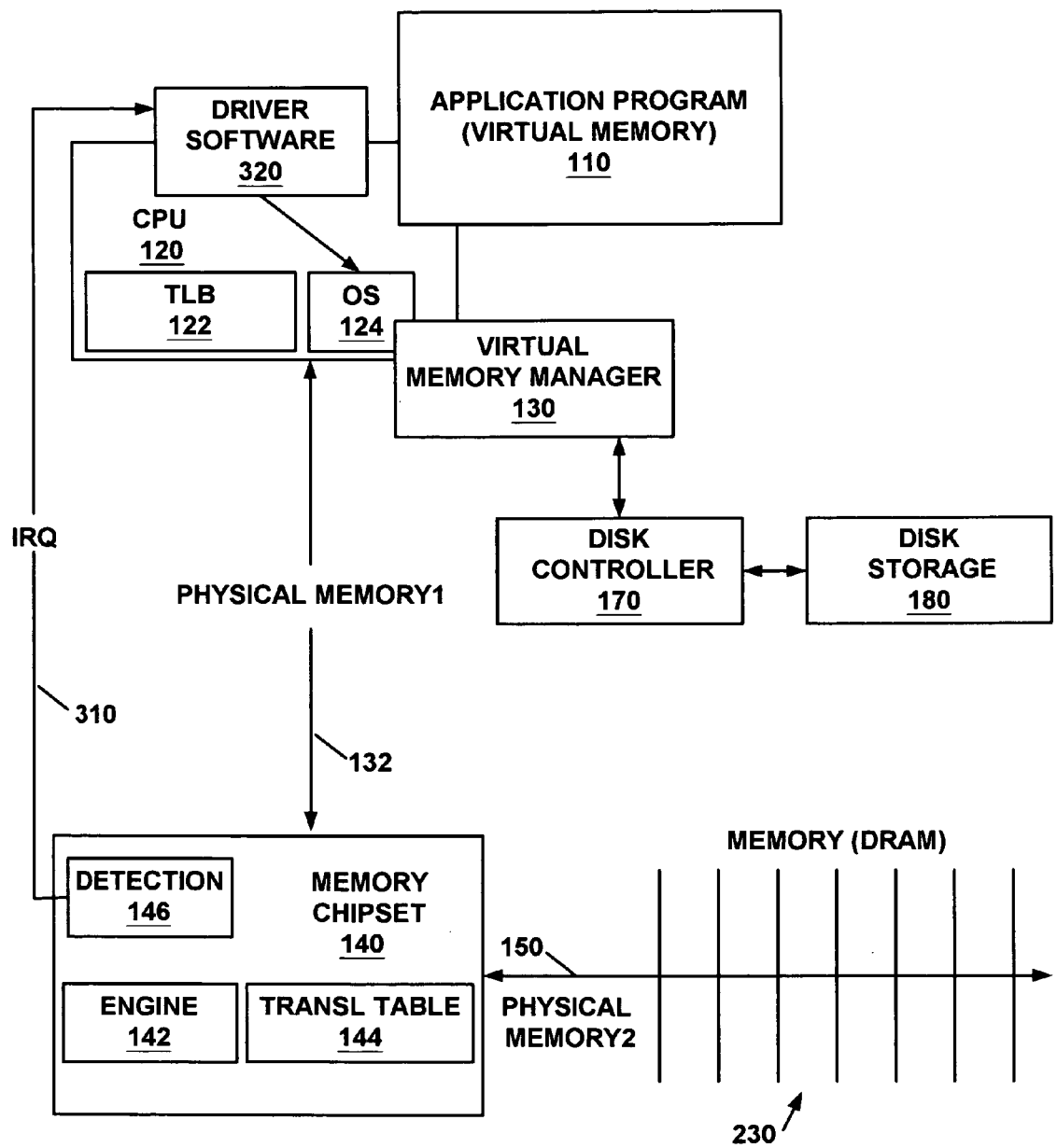
FIG. 5 is a logical block diagram of the second embodiment of the present invention as described with respect to FIG. 4A through FIG. 4C.

FIG. 5 illustrates a hardware diagram 100*c* of a system implementing the second embodiment of the present invention. This system 100*c* is analogous to system 100*a* except the hardware chipset 140 contains a detection circuit 146 that detects when usage of the memory map 230*a* of the DRAM 230 reaches the high threshold 238 and when usage of the memory map 230*a* falls below the low threshold 282. When either of these events occur, an interrupt is generated by the detection logic 146 over IRQ line 310 to the processor 120. The interrupts can be distinguished by interrupt designators. The interrupts cause the OS driver 320 to act. Namely, if the high threshold is reached, then the OS driver 320 requests a memory block from the physical memory space 270 of the operating system 124. If the low threshold was reached, then the OS driver 320 releases the memory block back to the operating system 124.

Figure 6A:
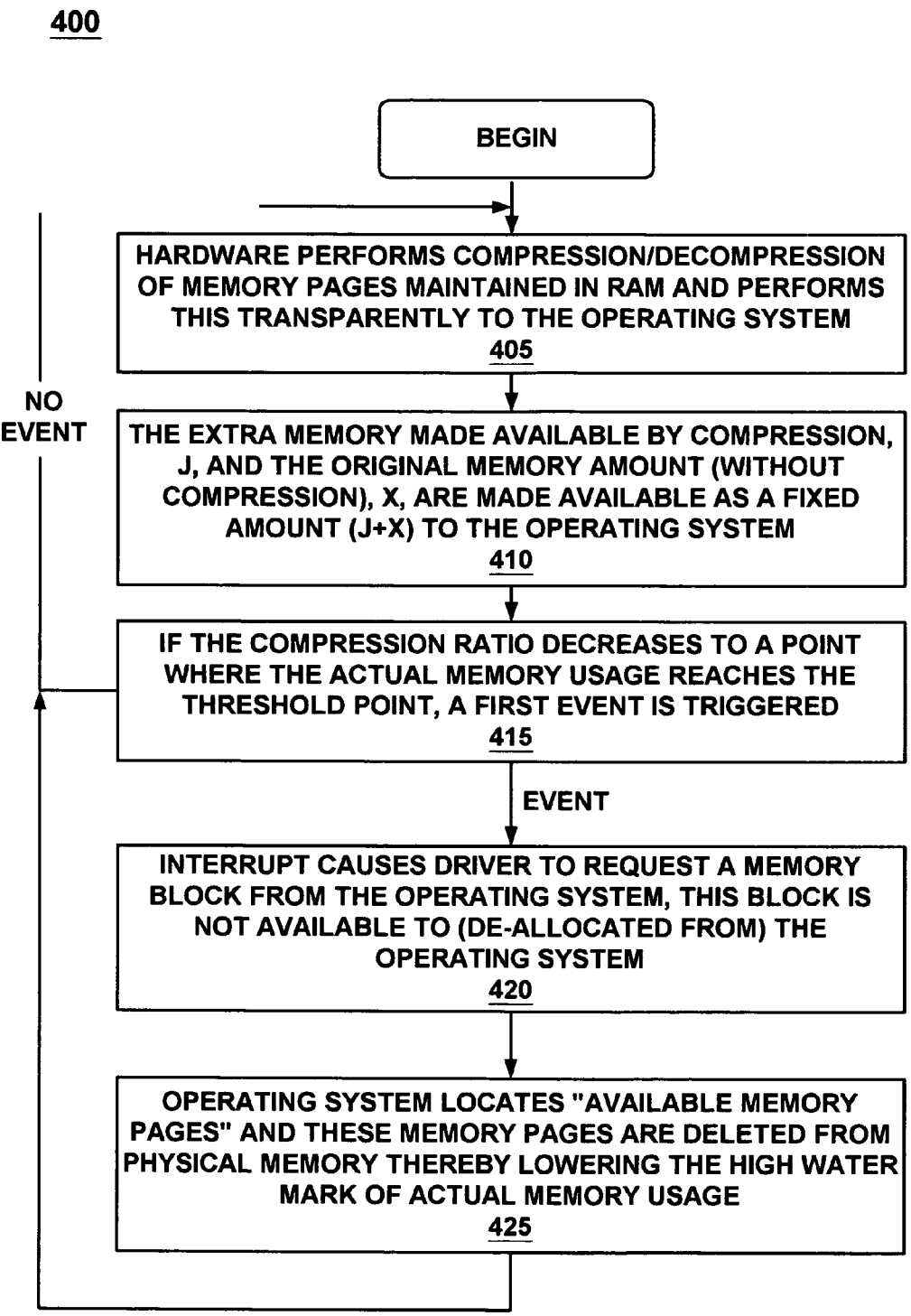
FIG. 6A is a flow diagram of steps performed by the second embodiment of the present invention for deallocating a memory block from the operating system.

FIG. 6A illustrates a flow diagram 400 of the high water mark detection process in accordance with the second embodiment of the present invention. At step 405, hardware performs compression/decompression of pages in the volatile memory and this is performed transparently to the operating system. The result is page compression in the memory map 230*a* while pages available to the operating system are uncompressed. At step 410, fixed sized physical memory space 270 is presented to the operating system including a portion, J, that is made available via compression. At step 415, if the situation as depicted in FIG. 4B occurs (e.g., as a result of a poor compression ratio) then step 420 is entered, otherwise process 400 returns to step 405. At step 420, the configuration as depicted in FIG. 4C occurs. Namely, an interrupt causes the OS driver to request a memory block 280. At step 425, the memory block 280 becomes deallocated from the operating system thereby causing pages of the physical memory space 230*a* to become deleted. As a result, the amount of used memory within the volatile memory decreases to an acceptable level without the operating system being aware of (1) the high water mark situation of FIG. 4B or (2) of any page compression.

Figure 6B:
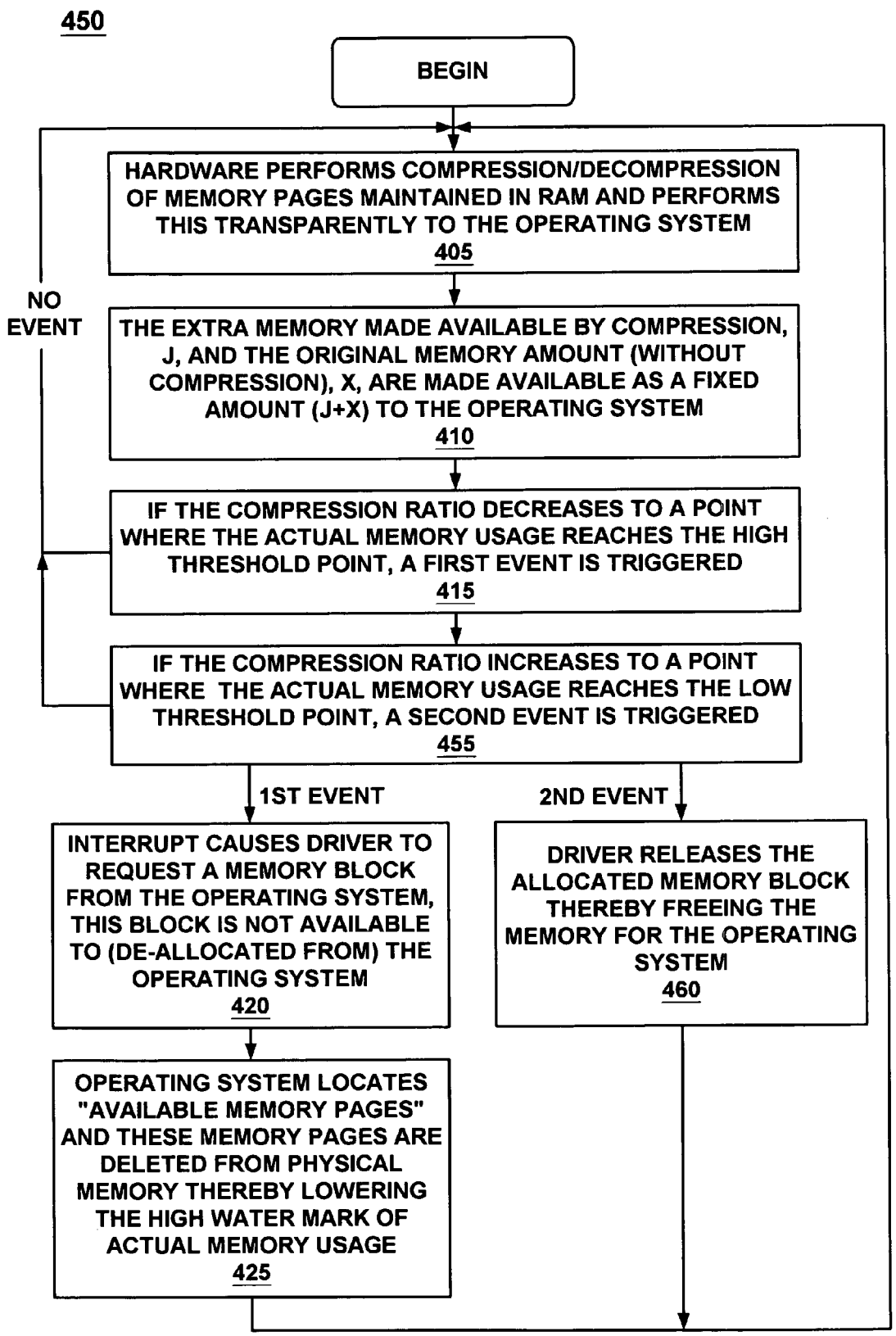
FIG. 6B is a flow diagram of steps performed by the second embodiment of the present invention for deallocating/allocating a memory block from/to the operating system.

FIG. 6B illustrates a flow diagram 450 which includes the high water mark detection process and a low water mark detection process in accordance with the second embodiment of the present invention. Steps 405–425 are analogous to those described with respect to FIG. 6A for the detection of the "first event." However, at step 455, if the compression ratio increases such that memory usage within the volatile memory falls below the low threshold mark 282 (the "second event"), then step 460 is entered. At step 460, the OS driver releases the memory block 280 back to the operating system thereby allowing its use for other tasks.

Transparent Compressed Memory Paging with Memory Cache

Figure 7:
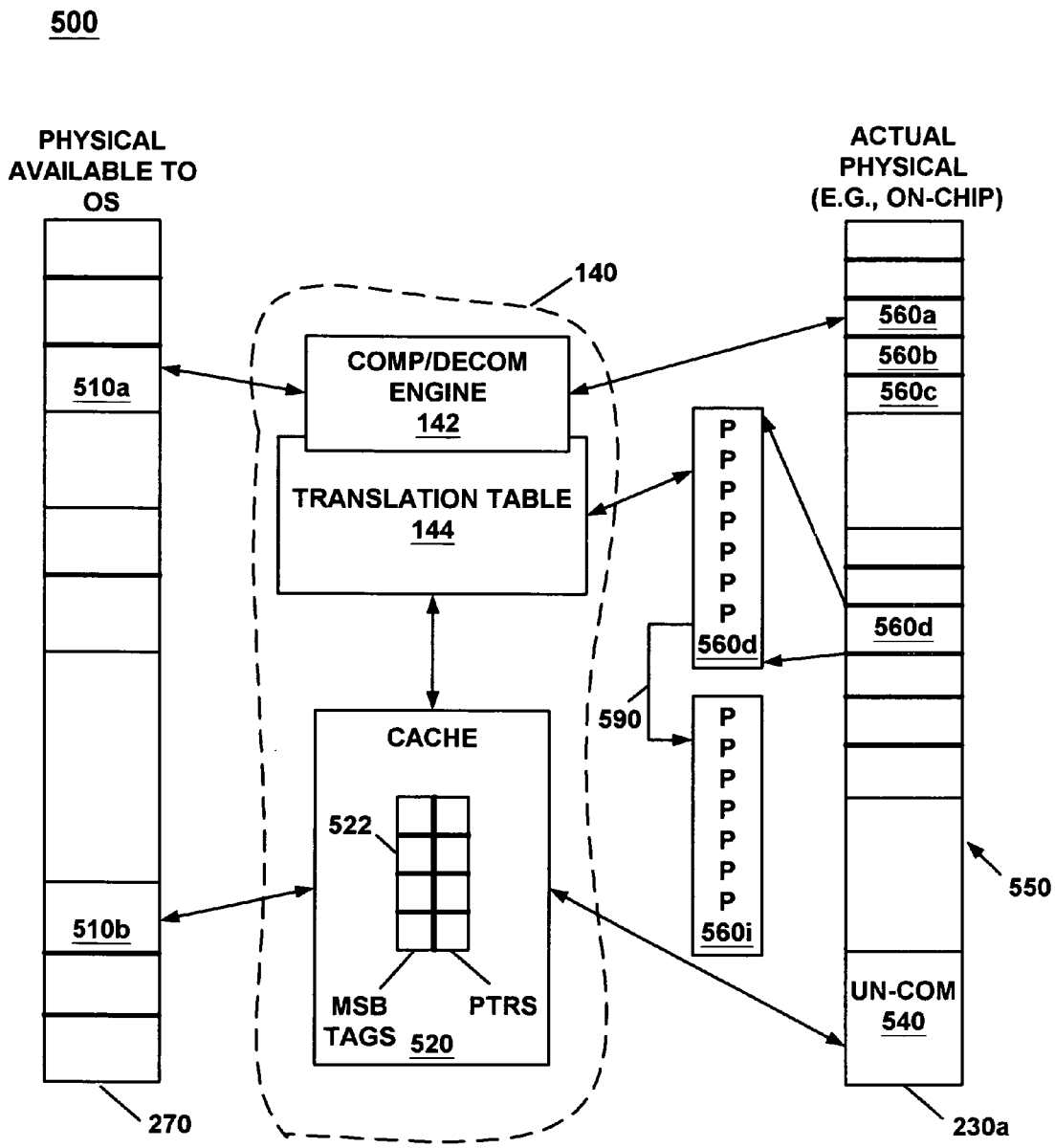
FIG. 7 is a data flow diagram of a third embodiment of the present invention for performing transparent compressed memory paging utilizing a cache of uncompressed physical memory pages.

FIG. 7 illustrates another embodiment of the present invention that utilizes a memory cache in combination with the transparent compressed memory paging embodiments described above. Specifically, the techniques in this embodiment can be applied to the first and second embodiments as described above. The techniques and mechanisms of the third embodiment are performance improvements over the general transparent compressed memory paging systems of the present invention.

Generally, accessing compressed memory can cause a significant performance slow down. To reduce such penalty, this embodiment manages a cache of uncompressed data in volatile memory. In one embodiment, a twin-bank memory architecture cache can be used which is organized as a 2-way set associative cache, for instance, where data are stored in the DRAM 230 and tags are stored within the chip-set 140. Memory reads will start access into both DRAM banks simultaneously and in parallel with on-chip tag lookups. Since on-chip tag lookup will be completed much before DRAM access is completed, way selection can be pre fan-out. Therefore, on the memory path there will be no delays. In one embodiment, there is a multiplexer on the data path anyway, so the data transition delay is the same and control can be pre-computed a clock earlier.

In one embodiment, at least 32 MB of cache 540 is provided. With a cache line of 1 KB, it translates into 32 K lines cached in DRAM. Equivalent tags are stored on-chip. For a 4 GB physical memory, 32 bit addresses are used, with 2 way×16 MB cache, therefore, only 8 bits are used for TAG. In one example, a valid bit is not necessary if it is guaranteed that both ways will be always in use and contain valid cache line. Dirty bit is an option for reducing recompression of unmodified cache lines. An LRU bit can be used. Minimum on chip SRAM could be 16 K 8+8+1 bits (e.g., about 33 KB) in one implementation.

FIG. 7 illustrates an exemplary implementation 500 in which uncompressed pages are 1 k in size and compressed pages are 128 bytes, for instance. In this exemplary embodiment, a size of 128 bytes is selected to hide the DRAM precharge time to make full use of efficient parallelism within the memory access mechanisms.

The physical memory space 230*a* is divided into a portion 550 that contains compressed pages and a cache 540 that contains uncompressed pages. In one embodiment, frequently used pages are cached into 540. Assuming a memory size of 2 GB, for instance, the cache 540 can be approximately 32 MB with the remainder being the compressed region 550. However, the cache size can be of any length. Page requests that arrive at the chip set 140 are compared against a cache table 522 which contains a listing of cache tags (which are the MSBs of the page addresses) and their associated page designators. In one embodiment, the designators are pointers into the physical memory map 230*a* for the associated page. If there is a tag hit (e.g., for page 510*b*), then the requested page exists in cache memory 540 and is directly supplied to the processor by the chipset 140 without any compression/decompression involvement.

However, if there is a cache miss (e.g., page 510a), then the page must be decompressed before it can be supplied to the processor. In this case, the translation table 144 locates the first compressed page 560a that corresponds to the requested page 510a. In one embodiment, there is a one-to-one mapping between the page 510a in physical memory 270 and its first compressed page 560a in physical memory 230a. A hash table can be used to provide the mapping. Depending on the compression ratio, multiple compressed pages 560a–560c may be required to represent the requested page 510a. In this case, each compressed page contains a pointer 592 to the next page in the sequence, if there are more than one page. In this case, the compressed pages are obtained and decompressed by engine 142 and then supplied to the processor by the chipset 140 as page 510a.

When a new page is to be stored in cache 540 (or when more than one page is required to store a compressed page), then empty pages need to be located. In one embodiment, the empty pages are identified by placing pointers to the empty pages within a special "empty pointer page" 560d also called a "free list." This page 560d contains pointers, "P," to the empty pages. Multiple empty pointer pages 560d–560i can be linked together via their own pointers 590. This is an efficient mechanism for locating empty pages because it requires fewer reads since reading one page 560d yields many free pages.

Regarding the memory space 550, when an empty page is located, or set of pages are located, the new page is compressed and stored therein. Regarding the cache 540, when an empty page is located, the cached page is written therein without compression and the cache table 520 is updated to reflect the new addition. Infrequently used pages within the cache 540 can be "cached out" of memory 540.

In one embodiment a free list 560d is a 128 byte data block containing: (1) a header; (2) a pointer to the next data block in the free list; and (3) pointers to free blocks. In one implementation, the 128 byte block could contain 126/3=40+1 pointers and 2 bytes of CRC16 bits. CRC16 can be important because corrupting a linked list could case memory corruption or even system hanging. An exemplary data structure is shown below.

Free list data block (128 bytes):

| Free list data block (128 bytes): | | |
|---|---|---|
| 3 bytes | 123 bytes | 2 bytes |
| NEXT | FREE [0 to 39] | CRC16 |

In one example, hardware 140 caches two or more free lists of data blocks. Released pages are appended and the requested block is removed in such case. In the case that the number of blocks in the cache is above an upper watermark, a predetermined number of data blocks pointers are removed from cache and added into the free list. In the case that number of blocks in the cache is below the lower watermark, the predetermined number of data block pointers are replenished from free list.

Disk Caching Optimization to Reduce Page Duplications

Figure 8A:
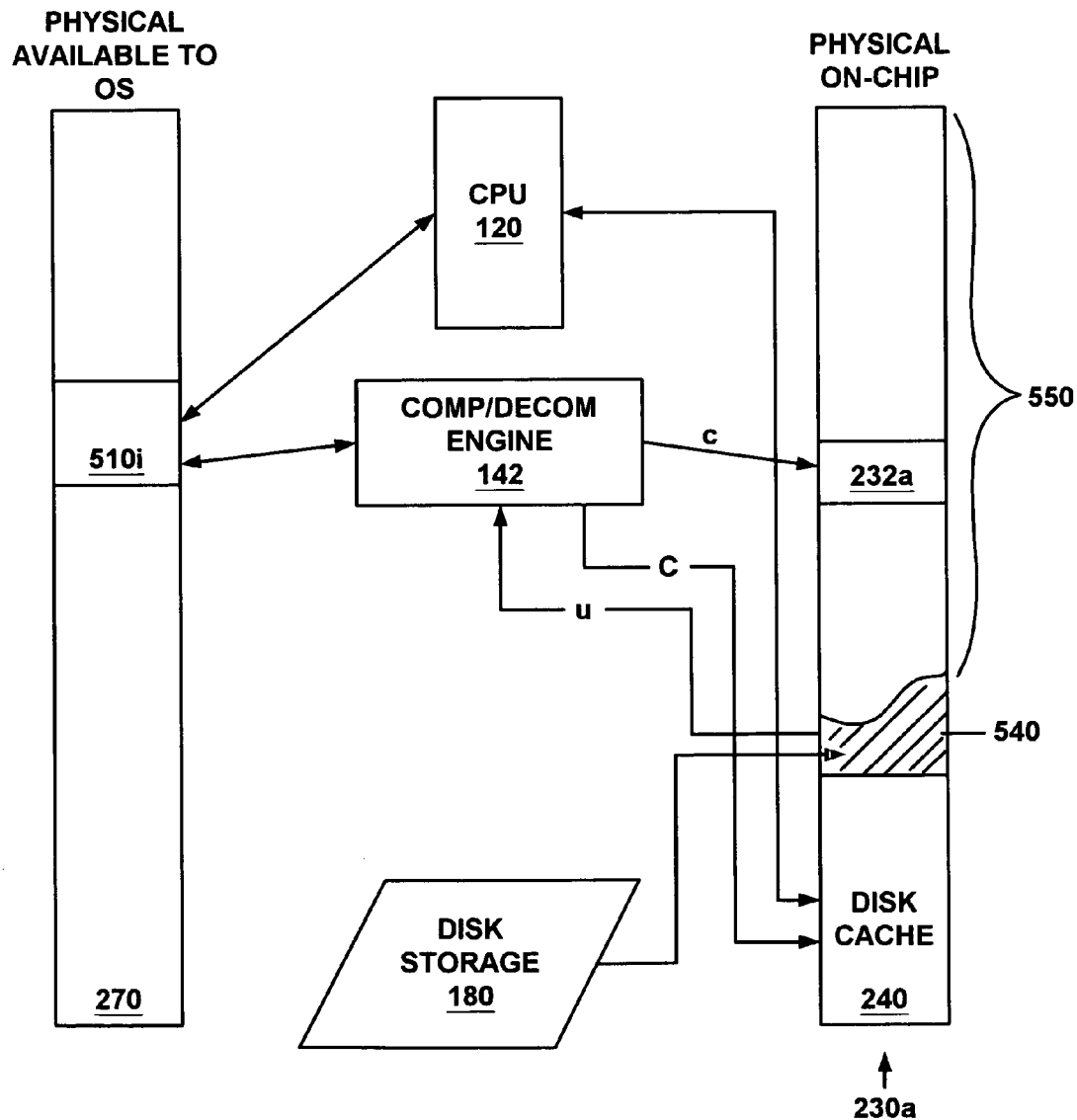
FIG. 8A is a data flow diagram of a fourth embodiment of the present invention for reducing duplicate storage in a system utilizing a disk cache.
Figure 8B:
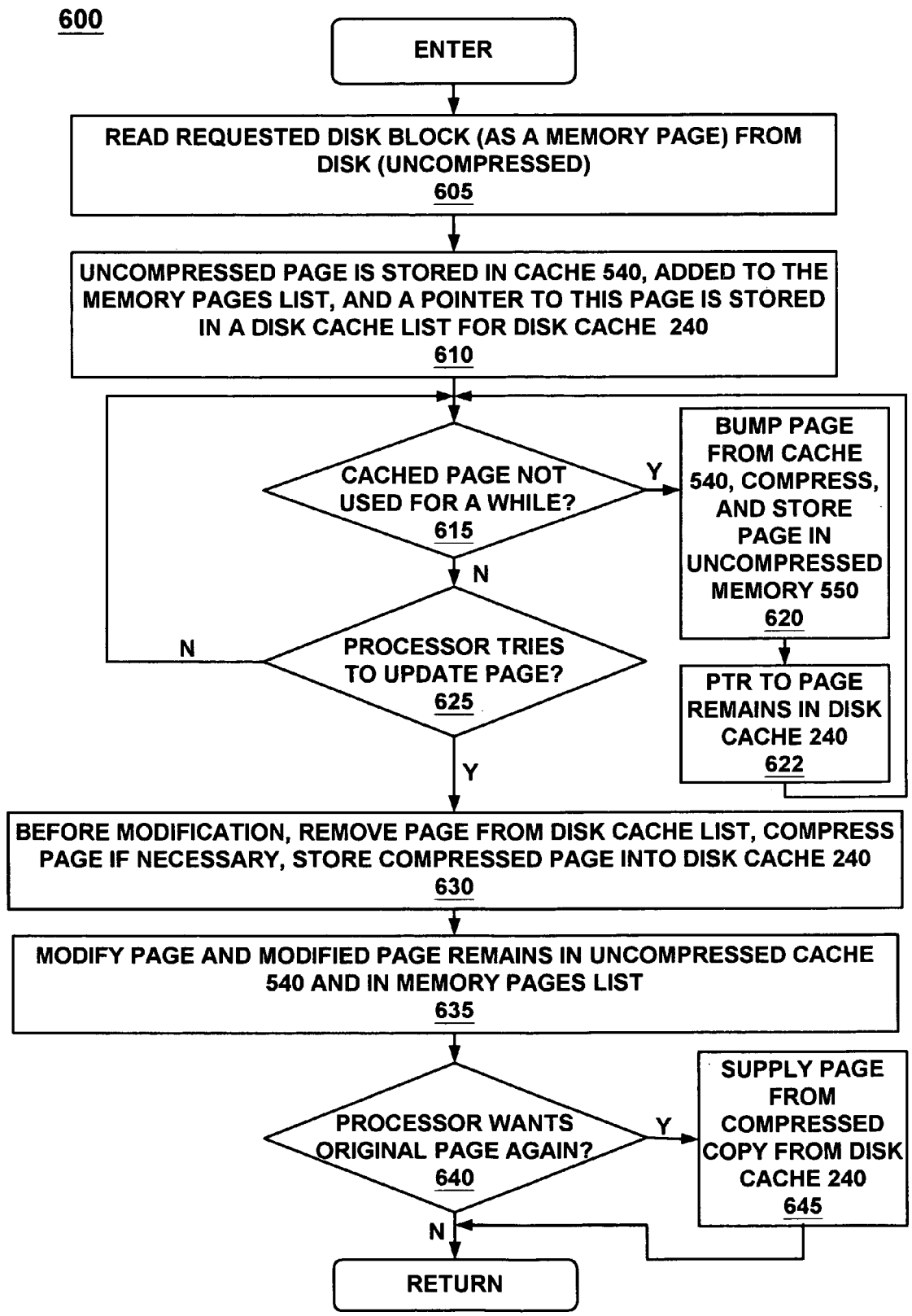
FIG. 8B is a flow diagram of a process for reducing duplicate storage in a system utilizing a disk cache in accordance with the fourth embodiment of the present invention.

FIG. 8A and FIG. 8B illustrate another embodiment of the present invention for reducing page duplication when performing disk caching, e.g., within the first embodiment of the present invention. This embodiment may be implemented in conjunction with a cache of uncompressed memory pages.

Generally, since all memory accesses are monitored by the system, it also monitors disk accesses to avoid duplicities of the disk cache 240 and the physical memory without cooperation from the operating system. Each time a disk page is read into memory, a page is also marked that it belongs to the disk cache. If the memory is read, then accessed bits of pages can be updated, e.g., to determine later on what should be removed from the cache. If the disk page is written by the processor, then a copy of page is made and stored in the disk cache. It still stays within the disk cache, but it is marked as removed from the physical memory. As a result, there are no duplicities in the disk cache and the physical memory because the same page is just in two lists.

With reference to FIG. 8A and FIG. 8B, process 600 is described which implements this embodiment. Regarding FIG. 8B, it is appreciated that memory 230a may contain a disk cache portion 240 and the remainder may be divided into a cache 540 of uncompressed pages and a portion 550 for storing compressed pages.

At step 605 of FIG. 8A, a new memory page, e.g., 4 k, is read from the disk storage 180 as part of a requested disk block. At step 610, this uncompressed memory page is stored in the cache of uncompressed memory pages 540 and thereby made available to the application which requested it. A pointer to this page is also stored in the disk cache list for disk cache 240. At this point, the page is available through both the disk cache 240 and cache 540 (and is listed in the memory pages list). At step 615, if the memory page is not used by the processor for a predetermined time period, then at 620 the memory page is bumped, e.g., removed, from the cache 540, compressed, and stored in a location 232a of the non-cache portion 550 of the physical memory 230a. Step 622 indicates that a pointer to the compressed page resides in the disk cache list of disk cache 240.

Regarding page reading, if the processor reads the page, and the page (or a page pointer) is located in cache 240, then the page is supplied through the cache 240 and not from the disk. If the processor reads the page, and the page is located in the non-cache portion of 230a, then the non-cache portion of 230a supplies the page after decompression. If the processor reads the page, and the page is located in the cache portion 540, then portion 540 supplies the page without decompression.

Regarding page writing, at step 625, if the processor tries to update this memory page, then step 630 is entered. At step 630, before the page is modified, the page pointer is removed from the disk cache list of disk cache 240, the page is compressed (if necessary), and the compressed version is stored in the disk cache 240. Then, at step 635, the processor is allowed to modify the uncompressed page and the modified page remains in the uncompressed cache 540 and in the memory pages list.

At step 640, if the original page is requested by the processor again (e.g., the disk block is again requested), the compressed page is obtained from the disk cache 240, not from the disk storage 180. In this way, duplicate pages are not stored in memory. By performing the above procedure, the original page is not duplicated in both the disk cache 240 and the portion of the physical memory 230a available to the operating system.

Compression/Decompression

Although any form of compression can be used with the present invention, in one exemplary embodiment, 2 types of compression processes and their combinations can be employed. One is based on replacing repeating text with pointers and a second one is based on statistical distributions of values. For the first one, decompression is serial in nature and for the second one decompression could be parallel on multiple streams. Usually the highest compression ratios are achieved if pointer replacement happened first and the results are passed through encoding based on statistics.

The speed of decompression is important for reducing latency penalties. For LZ type compression, a critical feedback path is determined by memory throughput and the variable bit size decoder throughput. For Huffman type compression, it is determined by the variable bit size decoder throughput. For improving parallelism, one stream of variable bit sized codes can be split into 2 or more streams on interleaving base (knowing offsets of sub-streams). The $0.13\mu$ standard memory generators produce SRAM running at 300 MHz or more. Having an LZ de-compressor with back pointers to minimum 2 B repeating sequences, and also assuming larger memory line reading/writing, the system can asymptotically hit almost 2 B/clock (for minimum 3 B repeating sequence hit almost 3 B/clock).

Having dual-ported memory, the system can almost double throughput, for instance, 300+MHz*2 bytes/clock*2 ports=1200 MB/s. Assuming 1 KB cache sectors, 1024 bytes/4 bytes/clock=256 clocks each 3.3 ns equals 853 ns (at least) additional latency which is realistic for minimum 3 B repeating patterns. Using register arrays, 128×64 b 2 R+2 W ports and minimum 3 B repeat pattern, then what is achieved is 1024/6 bytes/clock=171 clock*3.3 ns equals 570 ns as the worst case. Assuming a unique distribution of addresses during miss within 1024 bytes block, then the penalty for byte 0 is 0 ns and worst penalty for byte 1023 is 570 ns–3.3 ns, then the average will be a 285 ns decompression penalty. Since a cache hit ratio of 32+ MB cache will be high (over 97% can be expected), the average penalty is expected to be much less then 8.55 ns.

Latency of compression is not as important as throughput. Cache lines, which should be written-back from cache and therefore compressed can be buffered and multiple cache lines can be compressed independently in parallel. In the case that compression throughput is lower than memory write throughput (2.1 GB/s), buffers can be used to deal with burst traffic. If the system can compress 2 bytes/clock (register arrays 2 R+2 W) on 300+ MHz then one compressor will be able handle 600+ Mbytes/s. This means that 2–3 compressors can be used in the worst case according to one embodiment of the present invention.

Data Organization

A cache line after compression can be any arbitrary size smaller or equal to 1 KB (in the case of the cache line which cannot be compressed, it will be indicated by a dedicated bit). To avoid the problem of memory fragmentation, in one embodiment, the compressed line should be split into fixed sized blocks. 128 bytes blocks are selected to avoid wasting memory. In such case, 8×24 bit pointers are used for 2 GB physical memory. The 8×3 bytes equal 24 bytes which dictate a 32 byte index structure. This leaves 8 bytes for internal use.

An example data structure that can be used according to one exemplary embodiment is shown below:

| Index entry: | | | |
|---|---|---|---|
| 1 byte Header | 0–24 bytes 0 . . 7 Pointers | 10–31 bytes Tail bytes | 0/1 byte Split info |

| Header: | | | | | | | |
|---|---|---|---|---|---|---|---|
| 7 | 6 | 5 | 4 | 3 | 2 | 1 | 0 |
| — | A | M | S | T | T | T | T |

| Description: | |
|---|---|
| Letter | Meaning |
| — | Reserved |
| T | Entry type |
| S | Split info (T = 0001–0111) present if S = 1. |
| M | Line was modified if set to 1. |
| A | Line was accessed if set to 1. |

| Entry type (T): | |
|---|---|
| Value | Meaning |
| 0000–0111 | Number 0–7 × 128 byte blocks needed |
| 1000 | Uncompressed, 8 × 128 byte blocks needed |
| 1001 | Entry paged-out to hard disk |
| 1010–1111 | Reserved |

| Pointers (at byte address A): | | | | | |
|---|---|---|---|---|---|
| 23. | 16. | 15. | 8. | 7. | 0. |
| A + 2 | A + 1 | A + 0 | | | |

The optional split information is an 8 bit value indicating the number of last bytes does not need to be compressed (and still does not require additional data block to be allocated). Therefore, access to the last N bytes is not delayed by decompression as a performance optimization. Assume, that on average only 5–6 of the data 8 blocks will be in use (e.g., with a 50% or less compression ratio). Assume that a compressed stream will finish on any byte boundary with equal probability. In such case, on average 64 bytes will be unused. Taking advantage of this fact, it is indicated S=1 and also indicated are the number of last bytes that are stored in uncompressed form (split info byte).

Therefore, if DRAM cache miss is in any address 0..1023 with equal probability, in 1 out if 16 cases, the system can hit the last 64 bytes, which in frequent cases will be uncompressed (and can be available immediately without sequential decompression). Tail bytes are used in case the number of bytes beyond last data block will fit into this "extension" of the data block, so no new data block needs to be allocated.

Other optimizations are described below. By placing an index into the first data block, it will be possible to start decompressing data immediately after first memory access for retrieving the index block (and data block too, if merged). From 128 bytes only 23 bytes are header in the worst case, so remaining 105 bytes could be decompressed. Assuming 4 bytes per clock can be processed, then 26 cycles* 3.3 ns=86 ns are needed, which is mostly opening and reading the bank of the DRAM. First 32 bytes (16 bytes) does not need to be compressed because it will unlikely produce any benefits, but access time could be reduced by around 3.2%.

The foregoing descriptions of specific embodiments of the present invention, a method and system are described for implementing transparent compressed memory paging within a computer system, have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising:
    a processor for executing an operating system that utilizes a fixed-sized first portion of a first physical memory space which maps uncompressed memory pages, wherein said fixed-sized first portion presented to said operating system comprises an entire usable memory;
    a volatile memory for storing a plurality of compressed memory pages which are mapped according to a second physical memory space;
    a hardware engine coupled to said volatile memory and coupled to said processor for performing memory page compression and memory page decompression, wherein said memory page compression makes available an extended memory space that is a second portion of said first physical memory space; and
    a disk subsystem coupled to said processor for storing memory pages, wherein said extended memory space is used as a disk cache for frequently accessed memory pages from said disk subsystem.

2. A system as described in claim 1 wherein the size of said first portion is fixed.

3. A system as described in claim 2 wherein said memory page compression and said memory page decompression are both performed transparently to said operating system and wherein said extended memory space is unavailable for direct use by said operating system.

4. A system as described in claim 2 wherein said extended memory space varies in size depending on the available compression ratio obtained by said hardware engine and wherein said fixed-sized first portion of said first physical memory space is equal in size to said second physical memory space.

5. A system as described in claim 2 wherein memory pages of said first physical memory space are from (0.5 to 4.0) kilobytes in size and wherein memory pages of said second physical memory space are from (64 to 256) bytes in size.

6. A system as described in claim 2 wherein said volatile memory is dynamic random access memory (DRAM) and wherein memory pages of said second physical memory space are sized to hide a DRAM precharge time of said DRAM.

7. A system as described in claim 2 wherein said second physical memory space also maps a minority of uncompressed memory pages which function as a memory cache for frequently accessed memory pages from said second physical memory space.

8. A system as described in claim 7 wherein said second physical memory space is 2 Gigabytes in size comprising:
    a 32 Megabyte region for storing said minority of uncompressed memory pages; and
    a remainder region for storing said plurality of compressed memory pages.

9. A system as described in claim 7 further comprising a cache table for identifying uncompressed memory pages of said memory cache.

10. A system as described in claim 2 wherein each memory page of said first physical memory space maps in a one-to-one relationship with a respective first compressed memory page of said second physical memory space.

11. A system as described in claim 10 wherein a plurality of compressed memory pages of said second physical memory space correspond to a single uncompressed memory page of said first physical memory space and wherein said plurality of compressed memory pages are linked via pointers.

12. A system as described in claim 2 wherein said second physical memory space comprises a pointer memory page for storing pointers to empty memory pages within said second physical memory space.

13. A method of memory management within a computer system, said method comprising:
    using a first portion of a first physical memory space to map uncompressed memory pages used by an operating system, wherein the size of said first portion is fixed;
    compressing memory pages of said first physical memory space to produce compressed memory pages, wherein said compressing is performed transparently to said operating system;
    storing said compressed memory pages in a volatile memory according to a second physical memory space, wherein said compressing and said storing make available an extended memory space which is a second portion of said first physical memory space; and
    performing paging with respect to a disk subsystem, wherein said paging utilizes said extended memory space has a disk cache for caching frequently accessed pages from said disk subsystem;
    reading a first memory page from said disk subsystem;
    storing said first memory page in said first portion of said first physical memory space;
    storing a pointer of said first memory page into said disk cache;
    monitoring for modifications to said first memory page; and
    if said first memory page is to be modified, compressing a copy of said first memory page and storing said copy into said disk cache; and
    allowing said first memory page to be modified to create a second memory page and maintaining said second memory page in said first portion of said first physical memory space.

14. A method as described in claim 13 wherein said extended memory space is unavailable for direct use by said operating system and wherein said fixed-sized first portion of said first physical memory space is equal in size to said second physical memory space.

15. A method as described in claim 13 further comprising decompressing said compressed memory pages before supplying them to said operating system, wherein said decompressing is performed transparently to said operating system and wherein further said compressing and said decompressing are both performed by a hardware engine.

16. A method as described in claim 13 wherein said extended memory space varies in size depending on the available compression ratio obtained by said compressing.

17. A method as described in claim 13 wherein memory pages of said first physical memory space are from (0.5 to 4.0) kilobytes in size and wherein memory pages of said second physical memory space are from (64 to 256) bytes in size.

18. A method as described in claim 13 wherein said volatile memory is dynamic random access memory (DRAM) and wherein memory pages of said second physical memory space are sized to hide a DRAM precharge time of said DRAM.

19. A method as described in claim 13 wherein said second physical memory space also maps a minority of uncompressed memory pages and further comprising using said minority of uncompressed memory pages as a memory cache for frequently accessed memory pages from said second physical memory space.

20. A method as described in claim 19 wherein said second physical memory space is 2 Gigabytes in size comprising:
 a 32 Megabyte region as said memory cache for storing said uncompressed memory pages; and
 a remainder region for storing said compressed memory pages.

21. A method as described in claim 19 further comprising using a cache table for identifying uncompressed memory pages of said memory cache.

22. A method as described in claim 13 wherein each memory page of said first physical memory space maps in a one-to-one relationship with a respective first compressed memory page of said second physical memory space.

23. A method as described in claim 22 wherein a plurality of compressed memory pages of said second physical memory space correspond to a single uncompressed memory page of said first physical memory space and wherein said plurality of compressed memory pages are linked via pointers.

24. A method as described in claim 13 wherein said second physical memory space comprises a pointer memory page for storing pointers to empty memory pages within said second physical memory space.

25. A system comprising:
 a processor for executing an operating system that utilizes a first physical memory space which maps uncompressed memory pages, wherein said first physical memory space presented to said operating system comprises an entire usable memory;
 a volatile memory for storing a plurality of compressed memory pages which are mapped according to a second physical memory space that is smaller than said first memory space;
 a hardware engine coupled to said volatile memory and coupled to said processor for performing memory page compression and memory page decompression;
 a detection circuit for generating a first interrupt when usage of said second physical memory space reaches a high threshold; and
 a software driver, responsive to said first interrupt, for deallocating a dummy memory block of said first physical memory space from said operating system to reduce memory usage of said second physical memory space.

26. A system as described in claim 25 wherein the size of said first physical memory space is fixed.

27. A system as described in claim 26 wherein said detection circuit is also for generating a second interrupt when said usage of said second physical memory space falls to low threshold and wherein said software driver, in response to said second interrupt, is also for allocating back said dummy memory block to said first physical memory space.

28. A system as described in claim 26 wherein said memory page compression and said memory page decompression are both performed transparently to said operating system.

29. A system as described in claim 26 wherein memory pages of said first physical memory space are from (0.5 to 4.0) kilobytes in size and wherein memory pages of said second physical memory space are from (64 to 256) bytes in size.

30. A system as described in claim 26 wherein said volatile memory is dynamic random access memory (DRAM) and wherein memory pages of said second physical memory space are sized to hide a DRAM precharge time of said DRAM.

31. A system as described in claim 26 wherein said second physical memory space also maps a minority of uncompressed memory pages which function as a memory cache for frequently accessed memory pages from said second physical memory space.

32. A system as described in claim 31 wherein said second physical memory space is 2 Gigabytes in size comprising:
 a 32 Megabyte region for storing said minority of uncompressed memory pages; and
 a remainder region for storing said plurality of compressed memory pages.

33. A system as described in claim 32 further comprising a cache table for identifying uncompressed memory pages of said memory cache.

34. A system as described in claim 26 wherein each memory page of said first physical memory space maps in a one-to-one relationship with a respective first compressed memory page of said second physical memory space.

35. A system as described in claim 34 wherein a plurality of compressed memory pages of said second physical memory space correspond to a single uncompressed memory page of said first physical memory space and wherein said plurality of compressed memory pages are linked via pointers.

36. A system as described in claim 26 wherein said second physical memory space comprises a pointer memory page for storing pointers to empty memory pages within said second physical memory space.

37. A method of memory management within a computer system, said method comprising:
 using a first physical memory space to map uncompressed memory pages used by an operating system, wherein said first physical memory space presented to said operating system comprises an entire usable memory;
 compressing memory pages of said first physical memory space to produce compressed memory pages, wherein said compressing is performed transparently to said operating system;
 storing said compressed memory pages in a volatile memory according to a second physical memory space, wherein said second physical memory space is smaller than said first physical memory space;
 detecting when usage of said second physical memory space reaches a high threshold; and
 provided said high threshold is reached, deallocating a dummy memory block of said first physical memory space from said operating system to reduce memory usage of said second physical memory space.

38. A method as described in claim 37 wherein the size of said first physical memory space is fixed.

39. A method as described in claim 38 further comprising:
detecting when said usage of said second physical memory space falls to a low threshold; and
provided said low threshold is reached, allocating back said dummy memory block of said first physical memory space to said operating system.

40. A method as described in claim 38 further comprising decompressing said compressed memory pages before supplying them to said operating system, wherein said decompressing is performed transparently to said operating system and wherein further said compressing and said decompressing are both performed by a hardware engine.

41. A method as described in claim 38 wherein memory pages of said first physical memory space are from (0.5 to 4.0) kilobytes in size and wherein memory pages of said second physical memory space are from (64 to 256) bytes in size.

42. A method as described in claim 38 wherein said volatile memory is dynamic random access memory (DRAM) and wherein memory pages of said second physical memory space are sized to hide a DRAM precharge time of said DRAM.

43. A method as described in claim 38 wherein said second physical memory space also maps a minority of uncompressed memory pages and further comprising using said minority of uncompressed memory pages as a memory cache for frequently accessed memory pages from said second physical memory space.

44. A method as described in claim 43 wherein said second physical memory space is 2 Gigabytes in size comprising:
a 32 Megabyte region as said memory cache for storing said uncompressed memory pages; and
a remainder region for storing said compressed memory pages.

45. A method as described in claim 43 further comprising using a cache table for identifying uncompressed memory pages of said memory cache.

46. A method as described in claim 38 wherein each memory page of said first physical memory space maps in a one-to-one relationship with a respective first compressed memory page of said second physical memory space.

47. A method as described in claim 46 wherein a plurality of compressed memory pages of said second physical memory space correspond to a single uncompressed memory page of said first physical memory space and wherein said plurality of compressed memory pages are linked via pointers.

48. A method as described in claim 38 wherein said second physical memory space comprises a pointer memory page for storing pointers to empty memory pages within said second physical memory space.

49. A method of memory management within a computer system, said method comprising:
presenting an operating system with an amount of usable memory, the usable memory corresponding to a hardware memory;
storing memory pages into the hardware memory, the memory pages corresponding to the amount of usable memory;
compressing at least some of the memory pages with a hardware compression circuit, to reduce the amount of hardware memory needed to store the memory pages and to make at least some of the hardware memory unused for storing the memory pages, wherein the compressing is performed transparently to the operating system; and
utilizing the at least some of the memory unused for storing the memory pages as a disk cache for caching frequently accessed pages from a disk subsystem, wherein memory pages in said disk cache are not duplicated in said usable memory.

50. A method as described in claim 49 comprising:
storing virtual memory addresses entries in a tag memory, each of the entries having a fixed relationship to one of the memory pages that is not compressed.

* * * * *